(12) United States Patent
Zhang et al.

(10) Patent No.: US 11,825,088 B2
(45) Date of Patent: *Nov. 21, 2023

(54) ADAPTIVELY ENCODING VIDEO FRAMES BASED ON COMPLEXITY

(71) Applicant: INTEL CORPORATION, Santa Clara, CA (US)

(72) Inventors: Ximin Zhang, San Jose, CA (US); Sang-Hee Lee, San Jose, CA (US); Keith Rowe, Shingle Springs, CA (US)

(73) Assignee: INTEL CORPORATION, Santa Clara, CA (US)

( * ) Notice: Subject to any disclaimer, the term of this patent is extended or adjusted under 35 U.S.C. 154(b) by 829 days.

This patent is subject to a terminal disclaimer.

(21) Appl. No.: 16/684,952

(22) Filed: Nov. 15, 2019

(65) Prior Publication Data

US 2020/0084449 A1    Mar. 12, 2020

(51) Int. Cl.
*H04N 9/14*  (2006.01)
*H04N 19/124*  (2014.01)
*H04N 19/152*  (2014.01)
*H04N 19/172*  (2014.01)
*H04N 19/14*  (2014.01)

(52) U.S. Cl.
CPC .......... *H04N 19/124* (2014.11); *H04N 19/14* (2014.11); *H04N 19/152* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 11,265,552 B1* | 3/2022 | Fernandes | H04N 19/154 |
| 2003/0202580 A1* | 10/2003 | Noh | H04N 19/14 |
| | | | 348/700 |
| 2006/0233238 A1* | 10/2006 | Hinds | H04N 19/11 |
| | | | 375/E7.157 |
| 2008/0232468 A1* | 9/2008 | Kwon | H04N 19/147 |
| | | | 375/E7.157 |
| 2010/0054329 A1* | 3/2010 | Bronstein | H04N 19/154 |
| | | | 375/240.03 |
| 2015/0172680 A1* | 6/2015 | Zhou | H04N 19/15 |
| | | | 375/240.06 |
| 2017/0214938 A1* | 7/2017 | Zhang | H04N 19/177 |
| 2018/0048901 A1* | 2/2018 | Zhang | H04N 19/124 |
| 2018/0184089 A1* | 6/2018 | Zhang | H04N 19/114 |
| 2020/0329244 A1* | 10/2020 | Jou | H04N 19/126 |

* cited by examiner

*Primary Examiner* — Mohammad J Rahman
(74) *Attorney, Agent, or Firm* — HANLEY, FLIGHT & ZIMMERMAN, LLC (57) ABSTRACT

An example apparatus for encoding video frames includes a frame analyzer to execute a look ahead analysis on a received set of frames. The frame analyzer includes a look ahead video analyzer to down-sample the set of frames and encode the down-sampled frames with a constant quantization parameter (QP). A number of generated bits for each of the frames is used as a complexity measurement for each of the frames. The apparatus further includes an encoder to encode the input frame using an adjusted bit allocation based on a relative complexity of the input frame in relation to a complexity of the set of frames.

25 Claims, 7 Drawing Sheets

ADAPTIVELY ENCODING VIDEO FRAMES BASED ON COMPLEXITY

BACKGROUND

Encoders may compress video frames for transmission. For example, encoders may encode video frames into a compressed form using fewer bits than an original representation. Compression can be either lossy or lossless. Lossless compression reduces bits by identifying and eliminating statistical redundancy. No information is lost in lossless compression. Lossy compression reduces bits by removing unnecessary or less important information.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Bit rate control is one technique that differentiates one video solution from the other solutions. Under many circumstances, controlling the frame size to a predictable value may be used by applications, particularly network related applications. With an optimal bit allocation, both subjective and objective improvements can be obtained. However, no such solution appears to exist in the literature, especially for the High-Efficiency Video Coding (HEVC) and Advanced Video Coding (AV1) codecs. For example, the HEVC test model (HM) reference rate control assigns the size of each frame based on its location in a group of pictures (GOP) and the target compression ratio. As used herein, a GOP is a collection of successive pictures within a coded video stream. Each coded video stream consists of successive GOPs. As one example, if GOP8 is used, each frame within a GOP always use a fixed percentage of bits that is allocated to each 8 frames and same amount of bits are always allocated to each 8 frames. Such a pure compression ratio based strategy may cause quality fluctuations and lower overall quality for clips with periods of complex and simple scenes. Moreover, with a low bitrate coding and limited buffer size, the worst frame quality may be extremely bad in order to meet the Hypothetical Reference Decoder (HRD) compliancy requirement. In some video solutions, such as the x264 and x265 encoders, a look ahead may be enabled to analyze a set of frames before they are encoded. In using look ahead, the bit allocation may be better than a pure compression ratio based strategy. However, the quality fluctuations and worst frame quality may still be inefficient.

The present disclosure relates generally to techniques for encoding video frames. Specifically, the techniques described herein include an apparatus, method and system for adaptively encoding video frames based on content. An example apparatus includes a frame analyzer to execute a look ahead analysis and temporal correlation analysis on a received set of frames. The apparatus also includes a complexity based bit allocator to estimate an initial bit allocation for an input frame of the analyzed set of frames based on a relative complexity of the input frame to the analyzed set of frames. The apparatus further includes a temporal adaptive adjuster to adaptively adjust the initial bit allocation based on an estimated temporal correlation level. The apparatus further includes an encoder to encode the input frame based on the adjusted bit allocation.

The techniques described herein thus enable more bits to be allocated to intra frames for static clips and less bits to be allocated for more complex clips. Among inter frames, the techniques enable less bits to be allocated to relative simple frames such that more bits can be used in more complex frames. Compared to other solutions, experiments performed on AVC and HEVC have shown that the techniques can achieve up to 13 decibel (dB) quality gain for the worst frame quality. At the same time, the techniques enable much better subjective quality with smooth playback. In an example game clip, 4 db gain was obtained for the worst frame and ~0.7 db gain in average were obtained. For screen contents including application windows, 13 db gain for the worst frame and ~4 db gain in average were obtained. For example, using the techniques described herein, the bit allocation in a group of pictures may be adjusted in the case of static video, such as text being displayed in windows, such that the contents of the first frame are greatly improved and subsequent inter frames may thus depend on a higher quality frame. In this way, video quality may be improved overall.

Figure 1:
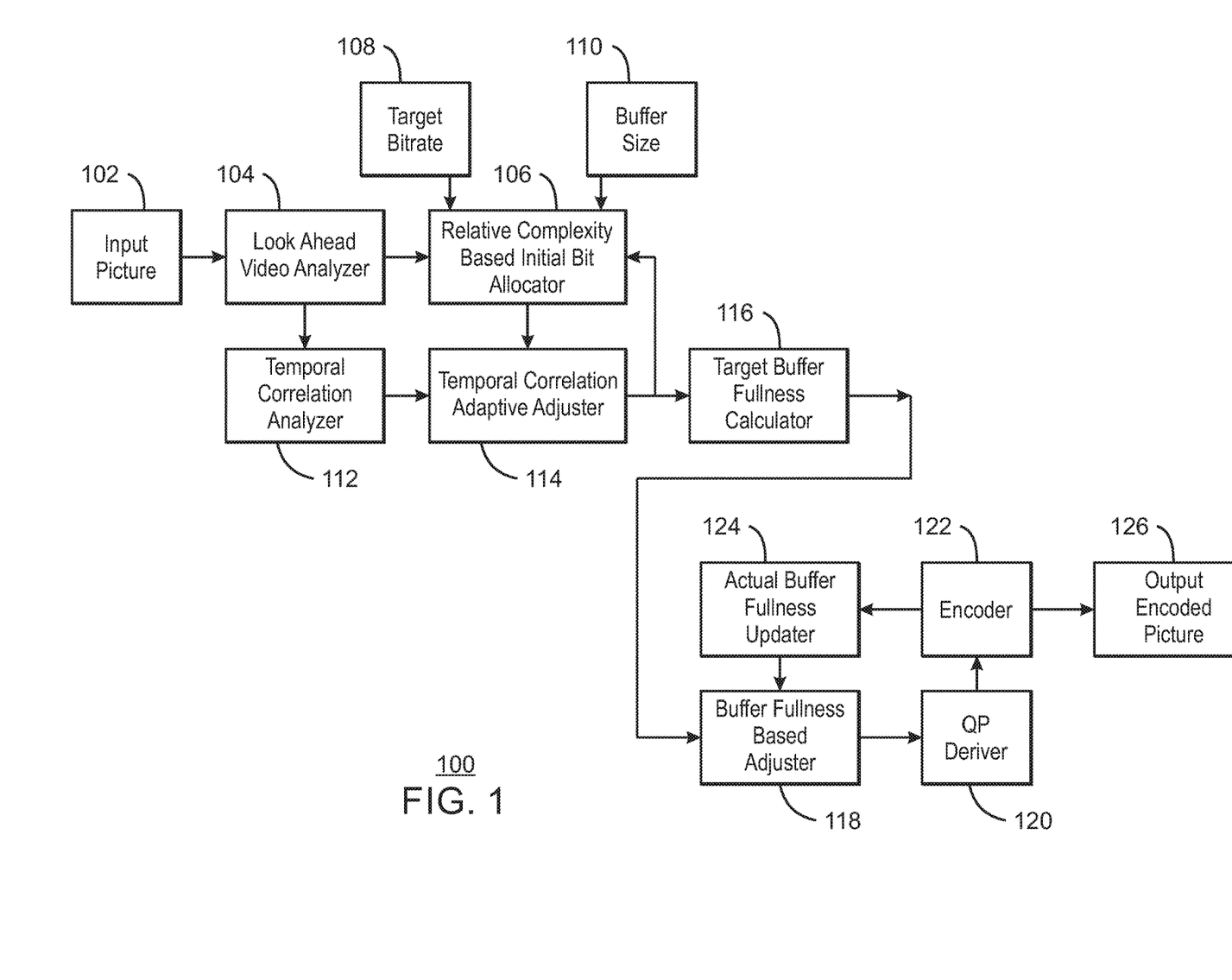
FIG. 1 is a block diagram illustrating an example system for adaptively encoding video frames based on content.

FIG. 1 is a block diagram illustrating an example system for adaptively encoding video frames based on content. The example system 100 can be implemented in the computing device 600 in FIG. 6 using the methods 200-500 of FIGS. 2-5.

The example system 100 includes an input picture 102 being received at a look ahead video analyzer 104. The system 100 includes a relative complexity based initial bit allocator 106 communicatively coupled to the look ahead video analyzer 104. The relative complexity based initial bit allocator 106 is shown receiving a target bitrate 108 and a buffer size 110. The system 100 includes a temporal correlation analyzer 112 communicatively coupled to the look ahead video analyzer 104. The system 100 also includes a temporal correlation adaptive adjuster 114 communicatively coupled to the temporal correlation analyzer 112 and the relative complexity based initial bit allocator 106. The system 100 further includes a target buffer fullness calculator 116 communicatively coupled to the temporal correlation adaptive adjuster 114. The system 100 also further includes a buffer fullness based adjuster 118 communicatively coupled to the target buffer fullness calculator 116. The system 100 also includes a quantization parameter (QP) deriver 120 communicatively coupled to the buffer fullness based adjuster 118 and an encoder 122. The encoder 122 is also communicatively coupled to the actual buffer fullness updater 124. The encoder 122 is shown outputting an output encoded picture 126.

In the example of FIG. 1, the system 100 may receive an input picture 102 and output encoded picture 126. For example, the input picture 102 may be one of a sequence of frames from a video to be encoded. The system 100 may use a look ahead analysis based bit allocation scheme to encode the frames. The look ahead analysis based bit allocation scheme includes a relative complexity based bit allocation to estimate the initial bit allocation of each frame based on its relative complexity to a set of pre-analyzed frames. For example, the pre-analyzed frames may be frames within a look ahead window. The look ahead analysis based bit allocation scheme includes a temporal correlation based adjustment of the initial bit allocation among each intra frame and its subsequent frames, and inter frame bit allocations among each mini group of pictures. As used herein, a mini group of pictures refers to a group of frames encoded with a hierarchical like bit allocation pattern. With the bit allocation and encoding buffer conditions, a target buffer fullness oriented adjustment can finalize the bit allocation during the encoding process.

Referring to FIG. 1, the look ahead video analyzer 104 can receive an input picture 102 and execute a look ahead analysis on N pictures before the actual encoding of the input picture 102 is started. As used herein, a look ahead refers to checking frames in the future, such as N−1 subsequent frames given a look ahead window of N including the current frame. Frames in the future may be described as those frames that occur after a current frame in a chronological sequence of frames. For example, the look ahead video analyzer 104 can look ahead of the input picture 102 by N−1 pictures. After the first frame, the current frame may be changed to a second subsequent frame and the look ahead window also moves one frame. This process, described in greater detail below, may be repeated until an end of the sequence of additional received input pictures 102. In various examples, the look ahead video analyzer 104 generates statistics for frame complexity and temporal correlative analysis. For example, the statistic may include frame complexity among other statistics, such as motion vectors and prediction distortion statistics. The look ahead video analyzer 104 can generate the frame complexity statistics based on actual encoding generated information. For example, the look ahead video analyzer 104 can down-sample the input pictures and encode the down-sampled pictures with a constant quantization parameter (QP). In some examples, the number of generated bits for each frame is used as the complexity measurement of the input picture 102.

In various examples, the relative complexity based initial bit allocator 106 can calculate an initial bit allocation for the first frame in a sequence based on the relative complexity of the first frame as compared to a complexity of a following number N frames, the bit budget for the next N frames, and the buffer size 110 constraint. For example, the number N may represent the number of pictures in the look ahead window. In various examples, once the complexity measurements are ready, the relative complexity based initial bit allocator 106 can execute an initial bit allocation by the following example procedure. For the first frame, the relative complexity based initial bit allocator 106 initializes the bit budget for the first N frames following the first frame using the equation:

$$\text{Bit\_budget} = N * \text{Average\_FrameSize} \qquad \text{Eq. 1}$$

where Average_FrameSize refers to an average frame size of the N frames. In some examples, if N is less than the number of frames in one second, then the relative complexity based initial bit allocator 106 can increase N to the number of frames in one second and calculate the budget. The relative complexity based initial bit allocator 106 can then calculate the sum of complexity using the equation:

$$\text{Sum\_Com} = \text{Com}[1] + \ldots + \text{Com}[N] \qquad \text{Eq. 2}$$

If N is less than the number of frames in one second, the relative complexity based initial bit allocator 106 can increase the sum to one second of frames with new added complexity as Com[N]. The relative complexity based initial bit allocator 106 can then calculate the bit allocation of the first frame using the equation:

$$\text{Bit\_Allocate}[1] = \text{Bit\_budget}[1] * \text{Com}[1] / \text{Sum\_Com} \qquad \text{Eq. 3}$$

In various examples, the relative complexity based initial bit allocator 106 can check the buffer fullness to find the maximum allowed frame size without a buffer violation. The relative complexity based initial bit allocator 106 can cap the allocated bits with the maximum allowed frame size. The relative complexity based initial bit allocator 106 can then update the Bit_budget using the equation:

$$\text{Bit\_budget}[next] = \text{Bit\_budget}[previous] - \text{Bit\_Allocate}[previous] + \text{Average\_FrameSize} \qquad \text{Eq. 4}$$

The relative complexity based initial bit allocator 106 can then repeat the above process for all the frames in the sequence.

The temporal correlation analyzer 112 can estimate a temporal correlation level for each frame. For example, the temporal correlation analyzer 112 can estimate a temporal correlation level for each frame at the same time that the initial bit allocation is calculated by the relative complexity based initial bit allocator 106. In various examples, the temporal correlation analyzer 112 can estimate a temporal correlation level for each frame using any suitable temporal correlation analysis. For example, the temporal correlation analyzer 112 can estimate a temporal correlation level using a non transform coefficient bits based temporal correlation method. For example, the temporal correlation analyzer 112 can classify each inter frame into four categories: a very low correlation category, a low correlation category, a moderate correlation category, and a high correlation category.

Then, the temporal correlation adaptive adjuster 114 may apply a temporal correlation adaptive adjustment to the initial bit allocation of the frames. For example, if the current frame is an intra frame or a scene change frame, the temporal correlation adaptive adjuster 114 can calculate a minimum temporal correlation among the subsequent N−1 frames. As used herein, a scene change refers to the picture contents changing from one scenario in previous picture to another scenario in a current picture. In various examples, a scene change frame can be encoded as any frame type. For example, the scene change frame may be encoded as an intra frame. The temporal correlation adaptive adjuster 114 can use this minimum temporal correlation to adjust the initial bit allocation for the intra frame or scene change frame. For example, the initial bit allocation may be adjusted higher if the temporal correlation is high. As one example, if the minimum correlation category among the N−1 frames is either very low correlation or low correlation, the temporal correlation adaptive adjuster 114 may make no adjustment and use the initial bit allocation. Otherwise, if the minimum correlation is moderate, the temporal correlation adaptive adjuster 114 can increase the initial bit allocation by t1 percent. Otherwise, if the minimum correlation is high, then the temporal correlation adaptive adjuster 114 may increase the initial bit allocation by t2 percent, where t2>t1. In various examples, the temporal correlation adaptive adjuster 114 can check the buffer fullness to find the maximum allowed frame size without buffer violation. The temporal correlation adaptive adjuster 114 can then cap the allocated bits with the maximum allowed frame size.

In various examples, for inter frames, the temporal correlation adaptive adjuster 114 can perform a mini GOP based hierarchical bit allocation adjustment. For example, the temporal correlation adaptive adjuster 114 can predefine a set of checkup tables which store the adjustment value based on the correlation category and GOP structure. With a given mini GOP of size M, the temporal correlation adaptive adjuster 114 can calculate the sum of bits allocated Bit_Allocate for the M frames and the minimum correlation among the M frames. For each frame in the mini GOP, the temporal correlation adaptive adjuster 114 can use a checkup table to find a corresponding adjustment value and multiply the corresponding adjustment value with the sum of the bits allocated Bit_Allocate to obtain an output bit allocation for the frame.

In some examples, the target buffer fullness calculator 116 then calculates a target buffer fullness according to the output bit allocation. The generated bit allocation and target buffer fullness is then sent to the encoder 122 for the encoding process. In various examples, the actual encoding process may use slightly more or less bits than the output bit allocation. Therefore, before the QP deriver 120 performs the QP derivation, the buffer fullness based adjuster 118 can compare a target buffer fullness to the actual buffer fullness from the actual buffer fullness updater 124. For example, the target buffer fullness may be based on the allocated bits for a set of frames using the look ahead analysis, while the actual buffer fullness may be based on an actual number of bits used in encoding a previous set of frames. According to the difference between the bits used by past encoded frames and the bits showed by the target buffer fullness, the buffer fullness based adjuster 118 can determine a final bit allocation of current frame and the QP deriver 120 may derive a quantization parameter accordingly based on the final bit allocation. For example, the final bit allocation may be adjusted to reduce the difference between the allocated bits in the target buffer and the number of actual bits used in the actual buffer fullness. The encoder 122 may then encode each frame based on its corresponding quantization parameter from the QP deriver 120 and output an encoded picture 126.

The diagram of FIG. 1 is not intended to indicate that the example system 100 is to include all of the components shown in FIG. 1. Rather, the example system 100 can be implemented using fewer or additional components not illustrated in FIG. 1 (e.g., additional input pictures, output encoded pictures, target bitrates, buffer sizes, analyzers, adjusters, encoders, etc.). In some examples, the relative complexity based initial bit allocator 106 may also receive maximum frame size and a minimum frame size constraints.

Figure 2:
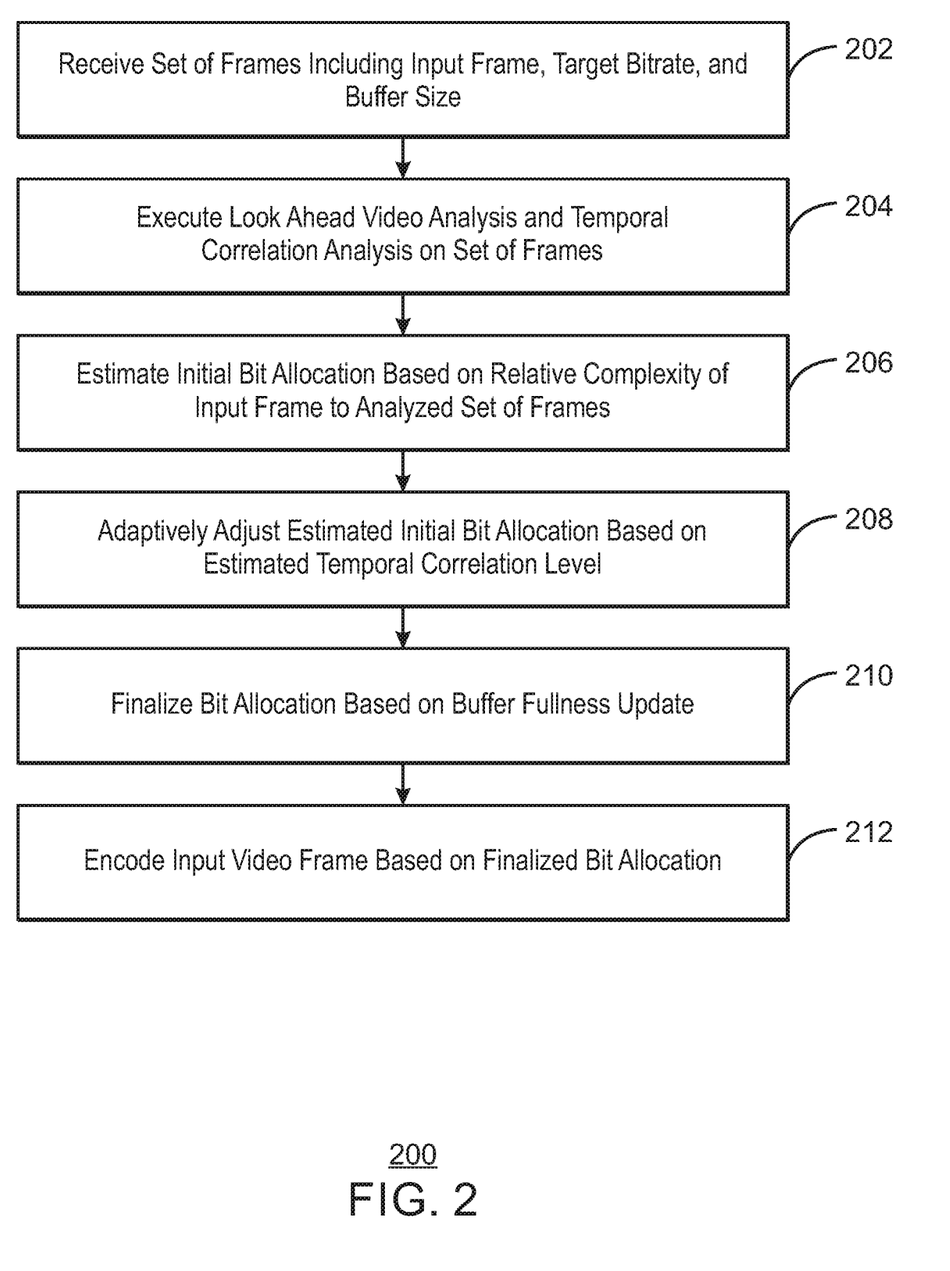
FIG. 2 is a flow chart illustrating a method for adaptively encoding video frames based on complexity.

FIG. 2 is a flow chart illustrating a method for adaptively encoding video frames based on complexity. The example method 200 can be implemented in the system 100 of FIG. 1, the computing device 600 of FIG. 6, or the computer readable media 700 of FIG. 7. For example, the method 200 may be executed via the processor 602 or the processor 702 of FIGS. 6 and 7.

At block 202, a processor receives a set of frames including an input frame, a target bitrate, and a buffer size. For example, the input frame may be a current frame to be encoded. The set of frames may include a number of frames corresponding to a look ahead window ahead of the input frame. The set of frames may also include frames within a mini group of pictures (GOP) including the input frame.

At block 204, the processor executes a look ahead analysis and temporal correlation analysis on the received set of frames. For example, the processor may generate statistics for frame complexity and temporal correlative analysis based on a predetermined number of frames subsequent of the input frame. In various examples, the processor can generate the frame complexity statistics based on actual encoding generated information. For example, the processor can down-sample the input frames and encode the down-sampled frames with a constant quantization parameter (QP). In some examples, the number of generated bits for each frame is used as the complexity measurement for the input frame. For example, more complex frames may be encoded with more bits and less complex frames may be encoded with less bits.

At block 206, the processor estimates an initial bit allocation for an input frame of the analyzed set of frames based on a relative complexity of the input frame to the analyzed set of frames. In some examples, the processor can calculate an initial bit allocation for the first frame based on the relative complexity of the frame, a bit budget for the next N frames, and the buffer size. For example, the processor may process all the frames in the look ahead window using Equations 1-4. In some examples, the processor may estimate the initial bit allocation using the method 300 of FIG. 3.

At block 208, the processor adaptively adjust the initial bit allocation based on an estimated temporal correlation level. For example, the processor may estimate the temporal correlation level for each frame using a non transform coefficient bits based temporal correlation method. As one example, the temporal correlation analyzer 112 can classify each inter frame into four categories, including a very low correlation category, a low correlation category, a moderate correlation category, and a high correlation category.

At block 210, the processor finalizes a bit allocation for the input frame based on a buffer fullness update. For example, the processor can check the buffer fullness to find the maximum allowed frame size without a buffer violation. The processor may then cap the allocated bits for the input frame with the maximum allowed frame size. For example, the final bit allocation may be adjusted to reduce a difference between the allocated bits in the target buffer and the number of actual bits used in the actual buffer fullness.

At block 212, the processor encodes the input frame based on the finalized bit allocation. In some examples, the processor may derive a quantization parameter based on the final bit allocation. For example, the quantization parameter may be a value ranging from 0 to 51 that is used as an index used to derive a scaling matrix. The processor may then encode each frame based on its corresponding quantization parameter and output an encoded frame.

For example, the processor can adjust estimated initial bit allocation among each intra frame and its subsequent frames and inter frame bit allocations among each mini group of frames.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation.

Figure 3:
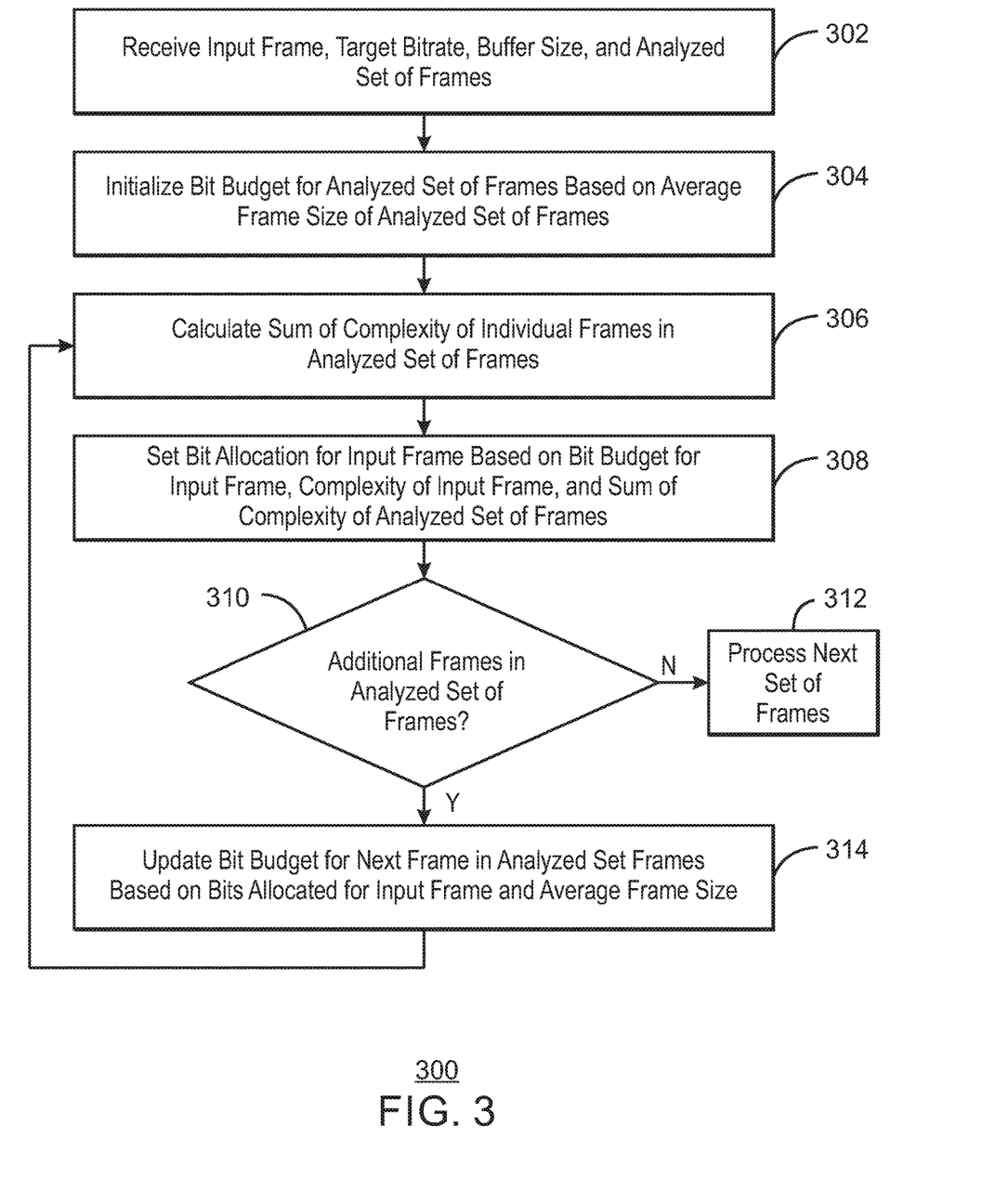
FIG. 3 is a flow chart illustrating a method for allocating bits based on relative complexity.

FIG. 3 is a flow chart illustrating a method for allocating bits based on relative complexity. The example method 300 can be implemented in the system 100 of FIG. 1, the computing device 600 of FIG. 6, or the computer readable media 700 of FIG. 7. For example, the method 300 can be implemented in the relative complexity based initial bit allocator 106 of the system 100 of FIG. 1. In various examples, the method 300 may be executed via the processor 602 or the processor 702 of FIGS. 6 and 7.

At block 302, a processor receives an input frame, a target bitrate, a buffer size, and an analyzed set of frames. For example, the input frame may be a current frame to be encoded. The target bitrate may be a bitrate at which an encoded video is to be transferred. The buffer size may be the size of a target buffer.

At block 304, the processor initializes a bit budget for the analyzed set of frames based on an average frame size of the analyzed set of frames. In various examples, the bit budget may be based on the number of frames and the average frame size for the frames. For example, the bit budget may be initialized using Eq. 1.

At block 306, the processor calculates a sum of complexity of individual frames in the analyzed set of frames. For example, the processor can calculate the sum of complexity.

At block 308, the processor sets a bit allocation for the input frame based on a bit budget for the input frame, a complexity of the input frame, and a sum of complexity of the analyzed set of frames. For example, the input frame may receive a higher bit allocation in response to detecting that the input frame has a higher complexity relative to the complexity of the analyzed set of frames. Similarly, the input frame may receive a lower bit allocation in response to detecting that the input frame has a lower complexity relative to the complexity of the analyzed set of frames.

At decision diamond 310, the processor determines whether there are additional frames in the analyzed set of frames. If there are not any additional frames remaining in the analyzed set of frames, then the method may continue at block 312. If there are additional frames in the analyzed set of frames, then the method may continue at block 314.

At block 312, the processor processes a next set of frames. For example, the next set of frames may be a subsequent mini group of pictures.

At block 314, the processor updates a bit budget for a next frame in the analyzed set of frames based on bits allocated for the input frame and the average frame size for the analyzed set of frames. For example, the bit budget for the next frame may be obtained using Eq. 1.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation.

Figure 4:
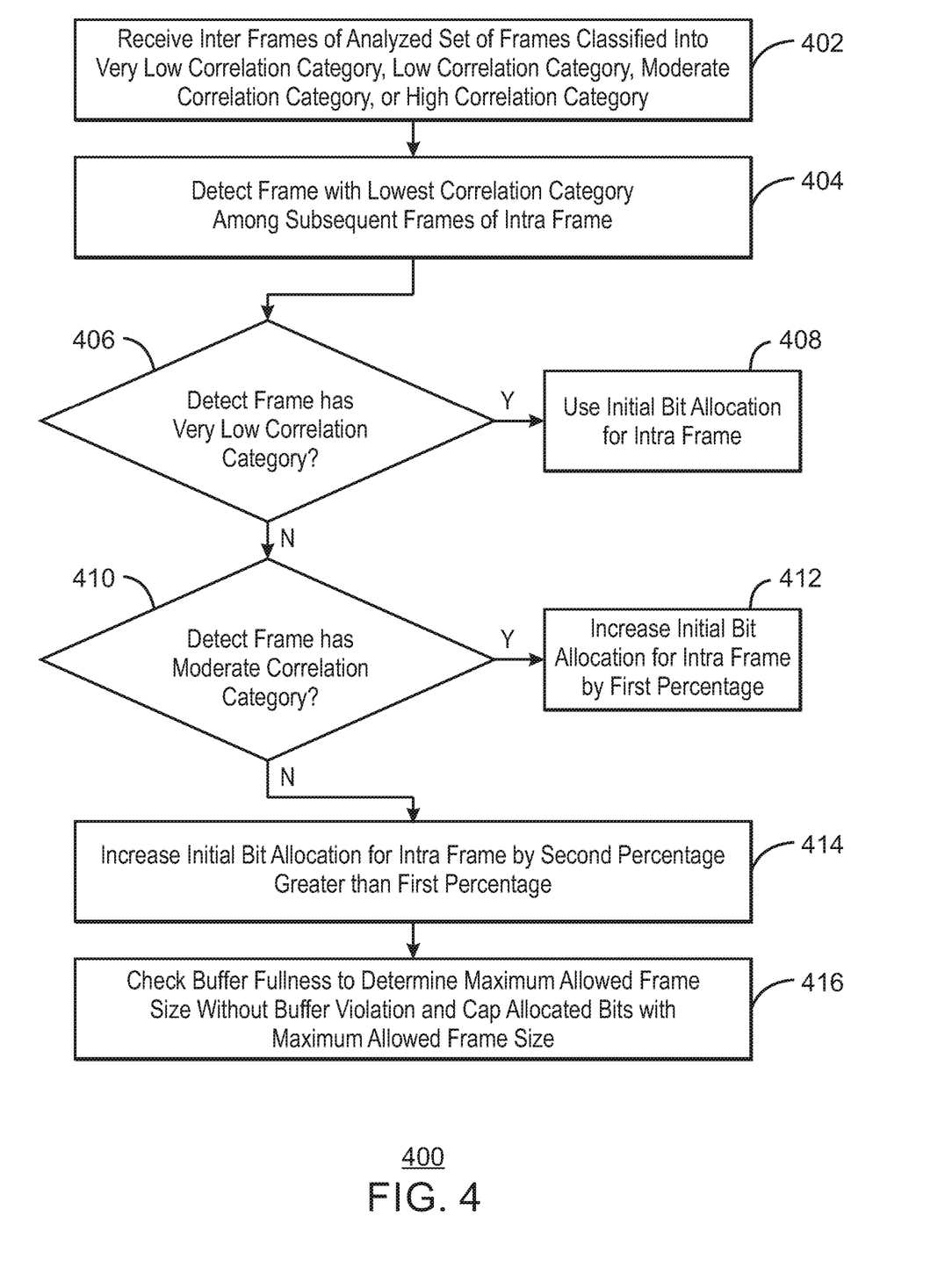
FIG. 4 is a flow chart illustrating a method for adaptively adjusting intra frames based on temporal correlation among the frames in a look ahead window.

FIG. 4 is a flow chart illustrating a method for adaptively adjusting intra frames based on temporal correlation among the frames in a look ahead window. The example method 400 can be implemented in the system 100 of FIG. 1, the computing device 600 of FIG. 6, or the computer readable media 700 of FIG. 7. For example, the method 300 can be implemented in the temporal correlation adaptive adjuster 114 of the system 100 of FIG. 1. In various examples, the method 300 may be executed via the processor 602 or the processor 702 of FIGS. 6 and 7.

At block 402, a processor receives inter frames of the analyzed set of frames that are classified into a very low correlation category, a low correlation category, a moderate correlation category, or a high correlation category. For example, the processor can estimate a temporal correlation level for each frame using a non transform coefficient bits based temporal correlation.

At block 404, the processor detects a frame with a lowest correlation category among subsequent frames of an intra frame. For example, the subsequent frames may be frames within a group of pictures associated with the intra frame.

At decision diamond 406, the processor determines whether the detected frame has a low correlation category or a very low correlation category. If the detected frame has a low correlation category or a very low correlation category, then the method may continue at block 408. If the detected frame does not have a low correlation category or a very low correlation category, then the method may continue at decision diamond 410.

At block 408, the processor uses an initial bit allocation for the intra frame. For example, the processor may use the initial bit allocation for the intra frame in response to detecting that the detected frame has a low correlation category or a very low correlation category.

At decision diamond 410, the processor determines whether the detected frame has a moderate correlation category. If the detected frame has a moderate correlation category, then the method may continue at block 412. If the detected frame does not have a moderate correlation category, then the method may continue at block 414. For example, the method may continue at block 414 if the detected frame has a high correlation category.

At block 412, the processor increases the initial bit allocation for the intra frame by a first percentage. For example, the processor may increase the initial bit allocation by a first percentage in response to detecting that the frame with the lowest correlation category is a moderate correlation category.

At block 414, the processor increases the initial bit allocation for the intra frame by a second percentage that is higher than a first percentage. For example, the processor may increase the initial bit allocation by the second percentage in response to detecting that the frame with the lowest correlation category is a high correlation category.

At block 416, the processor checks a buffer fullness to find the maximum allowed frame size without a buffer violation and caps the allocated bits with the maximum allowed frame size. For example, the processor checks a buffer fullness of actual encoding buffer and caps the allocated bits for the intra frame such that the actual encoding buffer is not exceeded.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
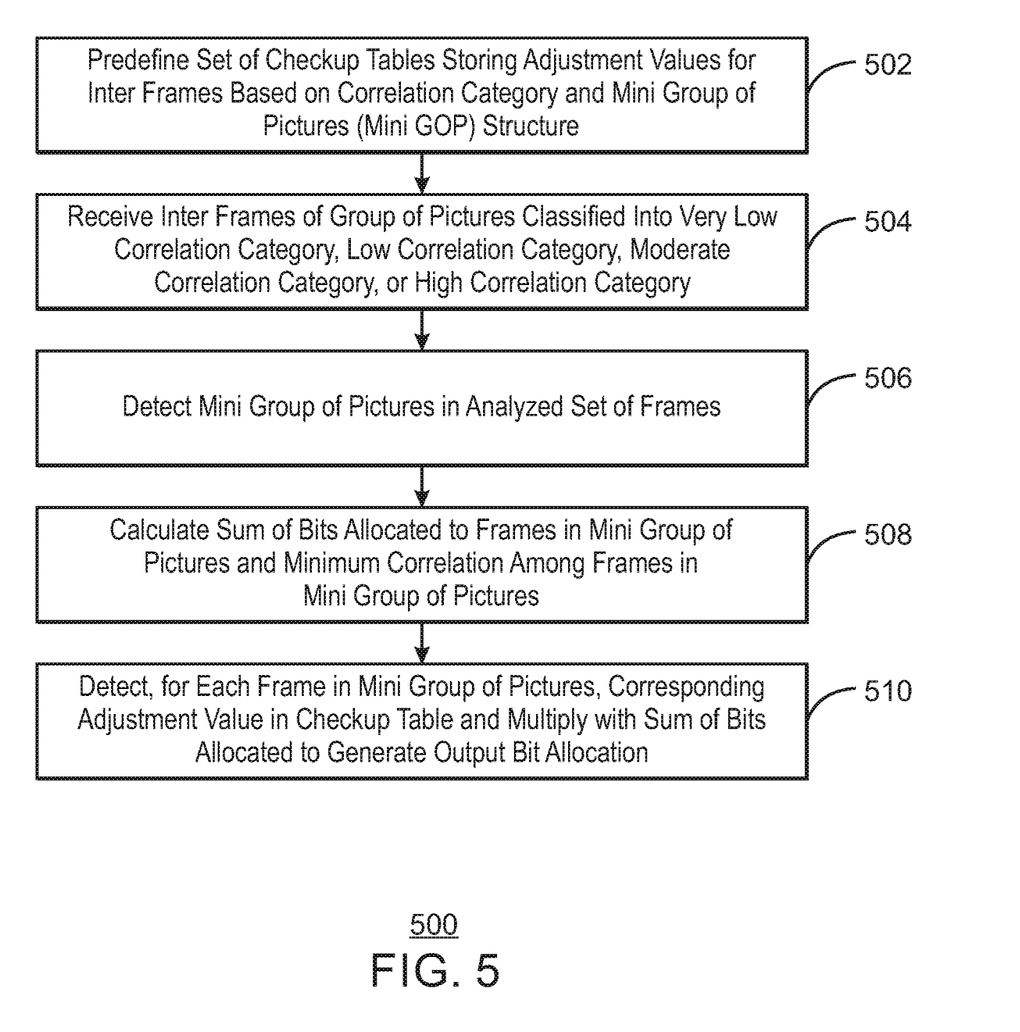
FIG. 5 is a flow chart illustrating a method for adaptively adjusting inter frames based on temporal correlation.

FIG. 5 is a flow chart illustrating a method for adaptively adjusting inter frames based on temporal correlation. The example method 500 can be implemented in the system 100 of FIG. 1, the computing device 600 of FIG. 6, or the computer readable media 700 of FIG. 7. For example, the method 500 can be implemented in the temporal correlation adaptive adjuster 114 of the system 100 of FIG. 1. In various examples, the method 500 may be executed via the processor 602 or the processor 702 of FIGS. 6 and 7.

At block 502, a processor predefining a set of checkup tables storing adjustment values for inter frames based on a correlation category and a mini group of pictures (mini GOP) structure. For example, the mini GOP structure may specifies the order in which frames are arranged within a GOP. In various examples, the mini GOP structure may also specify a hierarchical relative bit allocation to each frame in the mini GOP structure.

At block 504, the processor receives inter frames of the analyzed set of frames that are classified into a very low correlation category, a low correlation category, a moderate correlation category, or a high correlation category. In some examples, the analyzed set of frames may have been classified using any suitable method of temporal correlation analysis. For example, the inter frames may be classified into the correlation categories using correlation thresholds. As one example, the correlation thresholds can be the percentage of zero motion vectors.

At block 506, the processor detects a mini group of pictures in the analyzed set of frames. For example, the mini group of pictures may be detected based on a received mini GOP structure.

At block 508, the processor calculates a sum of bits allocated to frames in the mini group of pictures and a minimum correlation among frames in the mini group of pictures. For example, with a given GOP of size M, the processor can calculate the sum of bits allocated for the M frames and the minimum correlation among the M frames. In some examples, the minimum correlation may be the lowest correlation category detected among the M frames.

At block 510, the processor finds, for each frame in the mini group of pictures, a corresponding adjustment value in the checkup table and adjust the sum of bits allocated with the adjustment value to generate an output bit allocation. For example, the processor can multiply the adjustment value with the sum of bits allocated to generate an output bit allocation.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation.

Figure 6:
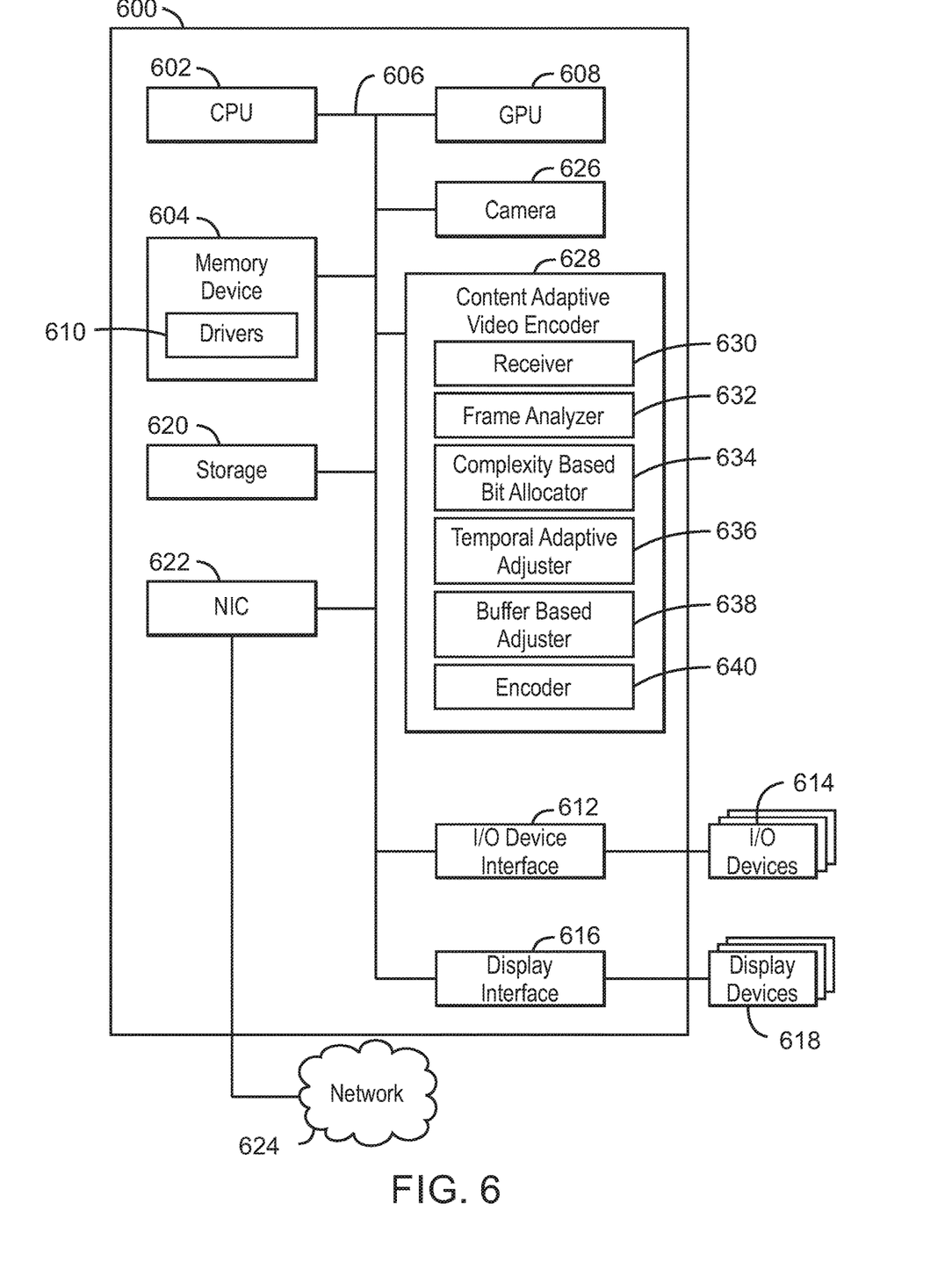
FIG. 6 is block diagram illustrating an example computing device that can adaptively encode video frames based on complexity.

Referring now to FIG. 6, a block diagram is shown illustrating an example computing device that can adaptively encode video frames based on complexity. The computing device 600 may be, for example, a laptop computer, desktop computer, tablet computer, mobile device, or wearable device, among others. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for training multiple convolutional neural networks to perform sequence independent processing. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 626. For example, the camera 626 may include one or more imaging sensors. In some example, the camera 626 may include a processor to generate video frames.

The computing device 600 further includes a content adaptive video encoder 628. For example, the content adaptive video encoder 628 can be used to adaptively encode video frames based on content. The content adaptive video encoder 628 can include a receiver 630, frame analyzer 632, a complexity based bit allocator 634, a temporal adaptive adjuster 636, a buffer based adjuster 638, and an encoder 640. In some examples, each of the components 630-640 of the content adaptive video encoder 628 may be a microcontroller, embedded processor, or software module. The receiver 630 can receive a set of frames including an input frame, a target bitrate, and a buffer size. The frame analyzer 632 can execute a look ahead analysis and temporal correlation analysis on a received set of frames. In some examples, the frame analyzer 632 can generate statistics for a predetermined number of frames. For example, the frame analyzer 632 can down-sample the set of frames and encode the down-sampled frames with a constant quantization parameter (QP). A number of generated bits for each of the frames is used as the complexity measurement for each of the frames. In various examples, the frame analyzer 632 can estimate a temporal correlation level for each frame in the set of frames. The complexity based bit allocator 634 can estimate an initial bit allocation for an input frame of the analyzed set of frames based on a relative complexity of the input frame to the analyzed set of frames. The temporal adaptive adjuster 636 can adaptively adjust the initial bit allocation based on an estimated temporal correlation level. For example, the temporal adaptive adjuster 636 can adjust the initial bit allocation for the input frame based on a correlation category of a subsequent frame with a lowest correlation category among subsequent frames of the input frame in response to detecting that the input frame is an intra frame. In some examples, the temporal adaptive adjuster 636 can increase the initial bit allocation above a first threshold in response to detecting that the input frame is an intra frame and that a lowest correlation category among subsequent frames of the input frame is a moderate correlation category. In various examples, the temporal adaptive adjuster 636 can increase the initial bit allocation above a second threshold that is higher than a first threshold in response to detecting that the input frame is an intra frame and that a lowest correlation category among subsequent frames of the input frame is a high correlation category. In some examples, the temporal adaptive adjuster 636 can find an adjustment value in a lookup table in response to detecting that the input frame is an inter frame. The buffer based adjuster 638 can finalize a bit allocation for the input frame based on an actual buffer fullness update. The encoder 640 can encode the input frame based on the adjusted bit allocation. In various examples, the encoder 640 can encode the input frame based on the finalized bit allocation for the input frame. Thus, the encoder 640 can encode the input frame using an adjusted bit allocation based on a relative complexity of the input frame in relation to a complexity of the set of frames.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. For example, the content adaptive video encoder 628 may further include any other components of FIG. 1. For example, the content adaptive video encoder 628 may further include a target buffer fullness calculator to calculate a target buffer fullness based on the adjusted bit allocation, or a quantization parameter deriver to derive a quantization parameter for the input frame based on a finalized bit allocation for the input frame. The computing device 600 may include any number of additional components not shown in FIG. 6, depending on the details of the specific implementation. Furthermore, any of the functionalities of the receiver 630, the frame analyzer 632, the complexity based bit allocator 634, the temporal adaptive adjuster 636, the buffer based adjuster 638, and the encoder 640, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the content adaptive video encoder 628 may be implemented with an application specific integrated circuit, in logic implemented in a processor, in logic implemented in a specialized graphics processing unit such as the GPU 608, or in any other device.

Figure 7:
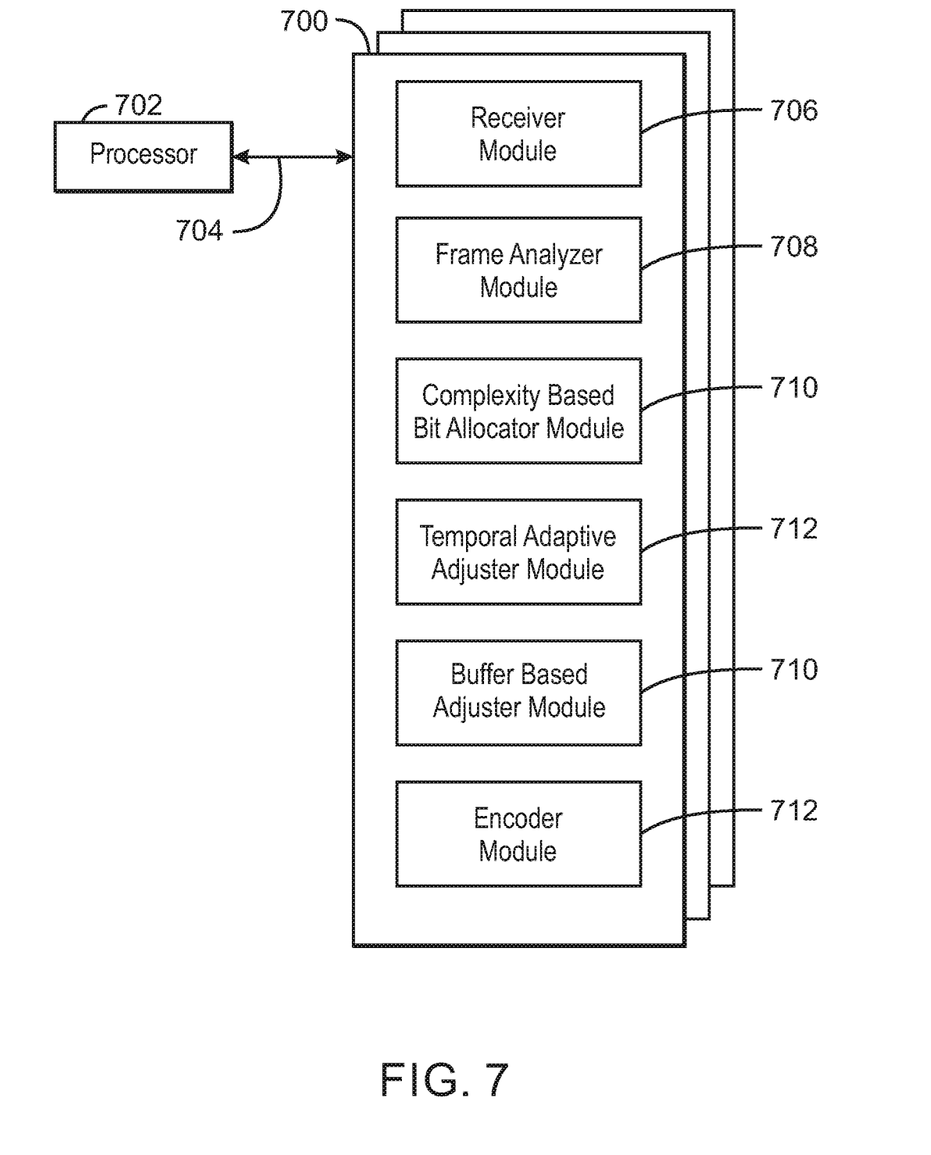
FIG. 7 is a block diagram showing computer readable media that store code for adaptively encoding video frames based on complexity.

FIG. 7 is a block diagram showing computer readable media 700 that store code for adaptively encoding video frames based on complexity. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a receiver module 706 may be configured to receive a set of frames including an input frame, a target bitrate, and a buffer size. A frame analyzer module 708 may be configured to execute a look ahead analysis and temporal correlation analysis on a received set of frames. For example, the frame analyzer module 708 may be configured to generate statistics for a predetermined number of frames. In various examples, the frame analyzer module 708 may be configured to estimate a temporal correlation level for each frame in the set of frames. A complexity based bit allocator module 710 may be configured to estimate an initial bit allocation for an input frame of the analyzed set of frames based on a relative complexity of the input frame to the analyzed set of frames. A temporal adaptive adjuster module 712 may be configured to adaptively adjust the initial bit allocation based on an estimated temporal correlation level. For example, the temporal adaptive adjuster module 712 may be configured to adjust the initial bit allocation for the input frame based on a correlation category of a subsequent frame with a lowest correlation category among subsequent frames of the input frame in response to detecting that the input frame is an intra frame. In some examples, the temporal adaptive adjuster module 712 may be configured to increase the initial bit allocation above a first threshold in response to detecting that the input frame is an intra frame and that a lowest correlation category among subsequent frames of the input frame is a moderate correlation category. In various examples, the temporal adaptive adjuster module 712 may be configured to increase the initial bit allocation above a second threshold that is higher than a first threshold in response to detecting that the input frame is an intra frame and that a lowest correlation category among subsequent frames of the input frame is a high correlation category. In some examples, the temporal adaptive adjuster module 712 may be configured to find an adjustment value in a lookup table in response to detecting that the input frame is an inter frame. A buffer based adjuster module 714 may be configured to finalize a bit allocation for the input frame based on an actual buffer fullness update. An encoder 716 may be configured to encode the input frame based on the adjusted bit allocation. In various examples, the encoder 716 may be configured to encode the input frame based on the finalized bit allocation for the input frame.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

Examples

Example 1 is an apparatus for encoding video frames. The apparatus includes a frame analyzer to execute a look ahead analysis on a received set of frames within a look ahead window. The frame analyzer includes a look ahead video analyzer to down-sample the set of frames and encode the down-sampled frames with a constant quantization parameter (QP). A number of generated bits for each of the frames is used as a complexity measurement for each of the frames. The apparatus includes an encoder to encode the input frame using an adjusted bit allocation based on a relative complexity of the input frame in relation to a complexity of the set of frames.

Example 2 includes the apparatus of example 1, including or excluding optional features. In this example, the apparatus includes a complexity based bit allocator to estimate an initial bit allocation for an input frame of the analyzed set of frames based on a relative complexity of the input frame to the analyzed set of frames.

Example 3 includes the apparatus of any one of examples 1 to 2, including or excluding optional features. In this example, the frame analyzer includes temporal correlation analyzer to perform a temporal correlation analysis on the received set of frames. The frame analyzer is to estimate a temporal correlation level for each frame in the set of frames.

Example 4 includes the apparatus of any one of examples 1 to 3, including or excluding optional features. In this example, the apparatus includes a temporal adaptive adjuster to adaptively adjust an initial bit allocation for the input frame based on a correlation category of a subsequent frame with a lowest correlation category among subsequent frames of the input frame in response to detecting that the input frame is an intra frame.

Example 5 includes the apparatus of any one of examples 1 to 4, including or excluding optional features. In this example, the apparatus includes a temporal adaptive adjuster to increase the initial bit allocation above a first threshold in response to detecting that the input frame is an intra frame and that a lowest correlation category among subsequent frames of the input frame includes a moderate correlation category.

Example 6 includes the apparatus of any one of examples 1 to 5, including or excluding optional features. In this example, the apparatus includes a temporal adaptive adjuster to increase the initial bit allocation above a second threshold that is higher than a first threshold in response to detecting that the input frame is an intra frame and that a lowest correlation category among subsequent frames of the input frame includes a high correlation.

Example 7 includes the apparatus of any one of examples 1 to 6, including or excluding optional features. In this example, the apparatus includes a temporal adaptive adjuster to find an adjustment value in a lookup table in response to detecting that the input frame is an inter frame.

Example 8 includes the apparatus of any one of examples 1 to 7, including or excluding optional features. In this example, the apparatus includes a target buffer fullness calculator to calculate a target buffer fullness based on the adjusted bit allocation.

Example 9 includes the apparatus of any one of examples 1 to 8, including or excluding optional features. In this example, the apparatus includes a buffer fullness based adjuster to finalize a bit allocation for the input frame based on an actual buffer fullness update. The encoder is to encode the input frame based on the finalized bit allocation for the input frame.

Example 10 includes the apparatus of any one of examples 1 to 9, including or excluding optional features. In this example, the apparatus includes a quantization parameter deriver to derive a quantization parameter for the input frame based on a finalized bit allocation for the input frame.

Example 11 is a method for encoding video frames. The method includes receiving, via a processor, a set of frames including an input frame, a target bitrate, and a buffer size. The method also includes executing, via the processor, a look ahead analysis and temporal correlation analysis on the set of frames. The method further includes estimating, via the processor, an initial bit allocation for the input frame based on a relative complexity of the input frame to the analyzed set of frames. The method also further includes adaptively adjusting, via the processor, the initial bit allocation based on an estimated temporal correlation level; finalizing, via the processor, a bit allocation for the input frame based on a buffer fullness. The method includes encoding, via the processor, the input frame based on the finalized bit allocation.

Example 12 includes the method of example 11, including or excluding optional features. In this example, estimating the initial bit allocation includes initializing a bit budget for the analyzed set of frames based on an average frame size of the analyzed set of frames. Estimating the initial bit allocation also includes calculating a sum of complexity of individual frames in the analyzed set of frames; and setting a bit allocation for the input frame based on a bit budget for the input frame, a complexity of input frame, and a sum of complexity of the analyzed set of frames.

Example 13 includes the method of any one of examples 11 to 12, including or excluding optional features. In this example, finalizing the bit allocation includes capping the bit allocation for the input frame based on the buffer fullness. The buffer fullness is used to calculate a maximum allowed frame size without any buffer violation.

Example 14 includes the method of any one of examples 11 to 13, including or excluding optional features. In this example, the method includes updating a bit budget for a next frame in the analyzed set of frames based on bits allocated for the input frame and the average frame size for the analyzed set of frames.

Example 15 includes the method of any one of examples 11 to 14, including or excluding optional features. In this example, adaptively adjusting the initial bit allocation includes receiving inter frames of the analyzed set of frames classified into a very low correlation category, a low correlation category, a moderate correlation category, or a high correlation category. Adaptively adjusting the initial bit allocation also includes detecting a frame with a lowest correlation category among subsequent frames of an intra frame. Adaptively adjusting the initial bit allocation also includes using the initial bit allocation for the intra frame in response to detecting that the frame with the lowest correlation category includes a low correlation category or a very low correlation category.

Example 16 includes the method of any one of examples 11 to 15, including or excluding optional features. In this example, adaptively adjusting the initial bit allocation includes receiving inter frames of the analyzed set of frames classified into a very low correlation category, a low correlation category, a moderate correlation category, or a high correlation category. Adaptively adjusting the initial bit allocation also includes detecting a frame with a lowest correlation category among subsequent frames of an intra frame. Adaptively adjusting the initial bit allocation also includes and increasing the initial bit allocation for the intra frame by a first percentage in response to detecting that the frame with the lowest correlation category includes a moderate correlation category.

Example 17 includes the method of any one of examples 11 to 16, including or excluding optional features. In this example, adaptively adjusting the initial bit allocation includes receiving inter frames of the analyzed set of frames classified into a very low correlation category, a low correlation category, a moderate correlation category, or a high correlation category. Adaptively adjusting the initial bit allocation also includes detecting a frame with a lowest correlation category among subsequent frames of an intra frame. Adaptively adjusting the initial bit allocation also includes increasing the initial bit allocation for the intra frame by a second percentage that is higher than a first percentage in response to detecting that the frame with the lowest correlation category includes a high correlation category.

Example 18 includes the method of any one of examples 11 to 17, including or excluding optional features. In this example, adaptively adjusting the initial bit allocation includes predefining a set of checkup tables storing adjustment values for inter frames based on a correlation category and a mini group of pictures (mini GOP) structure. Adaptively adjusting the initial bit allocation also includes receiving inter frames of the analyzed set of frames classified into a very low correlation category, a low correlation category, a moderate correlation category, or a high correlation category. Adaptively adjusting the initial bit allocation also includes detecting a mini group of pictures in the analyzed set of frames; calculating a sum of bits allocated to frames in the mini group of pictures and a minimum correlation among frames in the mini group of pictures. Adaptively adjusting the initial bit allocation also includes detecting, for each frame in the mini group of pictures, a corresponding adjustment value in the checkup table and multiplying the adjustment value with the sum of bits allocated to generate an output bit allocation.

Example 19 includes the method of any one of examples 11 to 18, including or excluding optional features. In this example, the method includes calculating a target buffer fullness based on the adjusted bit allocation.

Example 20 includes the method of any one of examples 11 to 19, including or excluding optional features. In this example, the method includes deriving a quantization parameter for the input frame based on a finalized bit allocation for the input frame.

Example 21 is at least one computer readable medium for encoding video frames having instructions stored therein that. The computer-readable medium includes instructions that direct the processor to execute a look ahead analysis and temporal correlation analysis on a received set of frames. The computer-readable medium also includes instructions that direct the processor to estimate an initial bit allocation for an input frame of the analyzed set of frames based on a relative complexity of the input frame to the analyzed set of frames. The computer-readable medium further includes instructions that direct the processor to adaptively adjust the initial bit allocation based on an estimated temporal correlation level. The computer-readable medium also further includes instructions that direct the processor to finalize a bit allocation for the input frame based on an actual buffer fullness update. The computer-readable medium also includes instructions that direct the processor to encode the input frame based on the adjusted bit allocation.

Example 22 includes the computer-readable medium of example 21, including or excluding optional features. In this example, the computer-readable medium includes instructions to cause the processor to generate statistics for a predetermined number of frames.

Example 23 includes the computer-readable medium of any one of examples 21 to 22, including or excluding optional features. In this example, the computer-readable medium includes instructions to cause the processor to estimate a temporal correlation level for each frame in the set of frames.

Example 24 includes the computer-readable medium of any one of examples 21 to 23, including or excluding optional features. In this example, the computer-readable medium includes instructions to cause the processor to adjust the initial bit allocation for the input frame based on a correlation category of a subsequent frame with a lowest correlation category among subsequent frames of the input frame in response to detecting that the input frame is an intra frame.

Example 25 includes the computer-readable medium of any one of examples 21 to 24, including or excluding optional features. In this example, the computer-readable medium includes instructions to cause the processor to increase the initial bit allocation above a first threshold in response to detecting that the input frame is an intra frame and that a lowest correlation category among subsequent frames of the input frame includes a moderate correlation category.

Example 26 includes the computer-readable medium of any one of examples 21 to 25, including or excluding optional features. In this example, the computer-readable medium includes instructions to increase the initial bit allocation above a second threshold that is higher than a first threshold in response to detecting that the input frame is an intra frame and that a lowest correlation category among subsequent frames of the input frame includes a high correlation.

Example 27 includes the computer-readable medium of any one of examples 21 to 26, including or excluding optional features. In this example, the computer-readable medium includes instructions to find an adjustment value in a lookup table in response to detecting that the input frame is an inter frame.

Example 28 includes the computer-readable medium of any one of examples 21 to 27, including or excluding optional features. In this example, the computer-readable medium includes instructions to calculate a target buffer fullness based on the adjusted bit allocation.

Example 29 includes the computer-readable medium of any one of examples 21 to 28, including or excluding optional features. In this example, the computer-readable medium includes instructions to finalize a bit allocation for the input frame based on an actual buffer fullness update and encode the input frame based on the finalized bit allocation for the input frame.

Example 30 includes the computer-readable medium of any one of examples 21 to 29, including or excluding optional features. In this example, the computer-readable medium includes instructions to derive a quantization parameter for the input frame based on a finalized bit allocation for the input frame.

Example 31 is a system for encoding video frames. The system includes a frame analyzer to execute a look ahead analysis on a received set of frames within a look ahead window. The frame analyzer includes a look ahead video analyzer to down-sample the set of frames and encode the down-sampled frames with a constant quantization parameter (QP). A number of generated bits for each of the frames is used as a complexity measurement for each of the frames. The system includes an encoder to encode the input frame using an adjusted bit allocation based on a relative complexity of the input frame in relation to a complexity of the set of frames.

Example 32 includes the system of example 31, including or excluding optional features. In this example, the system includes a complexity based bit allocator to estimate an initial bit allocation for an input frame of the analyzed set of frames based on a relative complexity of the input frame to the analyzed set of frames.

Example 33 includes the system of any one of examples 31 to 32, including or excluding optional features. In this example, the frame analyzer includes temporal correlation analyzer to perform a temporal correlation analysis on the received set of frames. The frame analyzer is to estimate a temporal correlation level for each frame in the set of frames.

Example 34 includes the system of any one of examples 31 to 33, including or excluding optional features. In this example, the system includes a temporal adaptive adjuster to adaptively adjust an initial bit allocation for the input frame based on a correlation category of a subsequent frame with a lowest correlation category among subsequent frames of the input frame in response to detecting that the input frame is an intra frame.

Example 35 includes the system of any one of examples 31 to 34, including or excluding optional features. In this example, the system includes a temporal adaptive adjuster to increase the initial bit allocation above a first threshold in response to detecting that the input frame is an intra frame and that a lowest correlation category among subsequent frames of the input frame includes a moderate correlation category.

Example 36 includes the system of any one of examples 31 to 35, including or excluding optional features. In this example, the system includes a temporal adaptive adjuster to increase the initial bit allocation above a second threshold that is higher than a first threshold in response to detecting that the input frame is an intra frame and that a lowest correlation category among subsequent frames of the input frame includes a high correlation.

Example 37 includes the system of any one of examples 31 to 36, including or excluding optional features. In this example, the system includes a temporal adaptive adjuster to find an adjustment value in a lookup table in response to detecting that the input frame is an inter frame.

Example 38 includes the system of any one of examples 31 to 37, including or excluding optional features. In this example, the system includes a target buffer fullness calculator to calculate a target buffer fullness based on the adjusted bit allocation.

Example 39 includes the system of any one of examples 31 to 38, including or excluding optional features. In this example, the system includes a buffer fullness based adjuster to finalize a bit allocation for the input frame based on an actual buffer fullness update. The encoder is to encode the input frame based on the finalized bit allocation for the input frame.

Example 40 includes the system of any one of examples 31 to 39, including or excluding optional features. In this example, the system includes a quantization parameter deriver to derive a quantization parameter for the input frame based on a finalized bit allocation for the input frame.

Example 41 is a system for encoding video frames. The system includes instructions that direct the processor to means for executing a look ahead analysis on a received set of frames within a look ahead window. The means for executing the look ahead analysis includes means for down-sampling the set of frames and encoding the down-sampled frames with a constant quantization parameter (QP). A number of generated bits for each of the frames is used as a complexity measurement for each of the frames; and means for encoding the input frame using an adjusted bit allocation based on a relative complexity of the input frame in relation to a complexity of the set of frames.

Example 42 includes the system of example 41, including or excluding optional features. In this example, the system includes means for estimating an initial bit allocation for an input frame of the analyzed set of frames based on a relative complexity of the input frame to the analyzed set of frames.

Example 43 includes the system of any one of examples 41 to 42, including or excluding optional features. In this example, the means for executing the look ahead analysis includes means for performing a temporal correlation analysis on the received set of frames. The means for performing the temporal correlation analysis is to estimate a temporal correlation level for each frame in the set of frames.

Example 44 includes the system of any one of examples 41 to 43, including or excluding optional features. In this example, the system includes means for adaptively adjusting an initial bit allocation for the input frame based on a correlation category of a subsequent frame with a lowest correlation category among subsequent frames of the input frame in response to detecting that the input frame is an intra frame.

Example 45 includes the system of any one of examples 41 to 44, including or excluding optional features. In this example, the system includes means for increasing the initial bit allocation above a first threshold in response to detecting that the input frame is an intra frame and that a lowest correlation category among subsequent frames of the input frame includes a moderate correlation category.

Example 46 includes the system of any one of examples 41 to 45, including or excluding optional features. In this example, the system includes means for increasing the initial bit allocation above a second threshold that is higher than a first threshold in response to detecting that the input frame is an intra frame and that a lowest correlation category among subsequent frames of the input frame includes a high correlation.

Example 47 includes the system of any one of examples 41 to 46, including or excluding optional features. In this example, the system includes means for finding an adjustment value in a lookup table in response to detecting that the input frame is an inter frame.

Example 48 includes the system of any one of examples 41 to 47, including or excluding optional features. In this example, the system includes means for calculating a target buffer fullness based on the adjusted bit allocation.

Example 49 includes the system of any one of examples 41 to 48, including or excluding optional features. In this example, the system includes means for finalizing a bit allocation for the input frame based on an actual buffer fullness update. The means for encoding the input frame is to encode the input frame based on the finalized bit allocation for the input frame.

Example 50 includes the system of any one of examples 41 to 49, including or excluding optional features. In this example, the system includes means for deriving a quantization parameter for the input frame based on a finalized bit allocation for the input frame.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for encoding video frames, the apparatus comprising:
    memory;
    computer readable instructions; and
    at least one processor to execute the computer readable instructions to at least:
        execute a look ahead analysis on a set of input frames within a look ahead window, the look ahead analysis to down-sample the set of input frames and encode the down-sampled frames with a constant quantization parameter (QP) to determine complexity measurements for respective ones of the set of input frames, wherein the complexity measurements are based on respective numbers of generated bits determined by the look ahead analysis for respective ones of the input frames;
        multiply a bit budget for the set of input frames by a ratio of a first complexity measurement for a first input frame of the set of input frames to a sum of the complexity measurements to estimate an initial bit allocation for the first input frame; and
        encode the first input frame using an adjusted bit allocation, the adjusted bit allocation based on the initial bit allocation.

2. The apparatus of claim 1, wherein the at least one processor is to initialize the bit budget for the set of input frames based on an average frame size of the set of input frames.

3. The apparatus of claim 1, wherein the at least one processor is to perform a temporal correlation analysis on the set of input frames to estimate a temporal correlation level for each frame in the set of input frames.

4. The apparatus of claim 1, wherein the at least one processor is to adaptively adjust the initial bit allocation for the first input frame based on a correlation category of a subsequent frame with a lowest correlation category among subsequent input frames of the first input frame in response to detecting that the first input frame is an intra frame.

5. The apparatus of claim 1, wherein the at least one processor is to increase the initial bit allocation above a first threshold in response to detecting that the first input frame is an intra frame and that a lowest correlation category among subsequent input frames of the first input frame corresponds to a moderate correlation category.

6. The apparatus of claim 1, wherein the at least one processor is to increase the initial bit allocation above a second threshold that is higher than a first threshold in response to detecting that the first input frame is an intra frame and that a lowest correlation category among subsequent input frames of the first input frame corresponds to a high correlation.

7. The apparatus of claim 1, wherein the at least one processor is to find an adjustment value in a lookup table in response to detecting that the first input frame is an inter frame.

8. The apparatus of claim 1, wherein the at least one processor is to calculate a target buffer fullness based on the adjusted bit allocation.

9. The apparatus of claim 1, wherein the at least one processor is to:
    finalize a bit allocation for the first input frame based on an actual buffer fullness update; and
    encode the first input frame based on the finalized bit allocation for the first input frame.

10. The apparatus of claim 1, wherein the at least one processor is to derive a quantization parameter for the first input frame based on a finalized bit allocation for the first input frame.

11. A method for encoding video frames, the method comprising:
    receiving, via a processor, a set of input frames including a first input frame, the set of input frames associated with a target bitrate and a buffer size;
    executing, via the processor, a look ahead analysis and temporal correlation analysis on the set of input frames;
    estimating, via the processor, an initial bit allocation for the first input frame based on multiplication of a bit budget for the set of input frames by a ratio of a first complexity of the first input frame to a sum of complexities of the set of input frames;

adaptively adjusting, via the processor, the initial bit allocation based on an estimated temporal correlation level;

determining, via the processor, a finalized bit allocation for the first input frame based on a buffer fullness; and encoding, via the processor, the first input frame based on the finalized bit allocation.

12. The method of claim 11, wherein the estimating of the initial bit allocation includes initializing the bit budget for the set of input frames based on an average frame size of the set of input frames.

13. The method of claim 11, wherein the determining of the finalized bit allocation includes capping the finalized bit allocation for the first input frame based on buffer fullness, wherein the buffer fullness is used to calculate a maximum allowed frame size without any buffer violation.

14. The method of claim 11, including updating a second bit budget for a next frame in the set of input frames based on bits allocated for the first input frame and an average frame size for the set of input frames.

15. The method of claim 11, wherein the adaptively adjusting of the initial bit allocation includes:
receiving inter frames of the set of input frames classified into a very low correlation category, a low correlation category, a moderate correlation category, or a high correlation category;
detecting one of the input frames with a lowest correlation category among subsequent frames of an intra frame; and
using the initial bit allocation for the intra frame in response to detecting that the one of the input frames with the lowest correlation category corresponds to a low correlation category or a very low correlation category.

16. The method of claim 11, wherein the adaptively adjusting of the initial bit allocation includes:
receiving inter frames of the set of input frames classified into a very low correlation category, a low correlation category, a moderate correlation category, or a high correlation category;
detecting one of the input frames with a lowest correlation category among subsequent frames of an intra frame; and
increasing the initial bit allocation for the intra frame by a first percentage in response to detecting that the one of the input frames with the lowest correlation category corresponds to a moderate correlation category.

17. The method of claim 11, wherein the adaptively adjusting of the initial bit allocation includes:
receiving inter frames of the set of input frames classified into a very low correlation category, a low correlation category, a moderate correlation category, or a high correlation category;
detecting one of the input frames with a lowest correlation category among subsequent frames of an intra frame; and
increasing the initial bit allocation for the intra frame by a second percentage that is higher than a first percentage in response to detecting that the one of the input frames with the lowest correlation category corresponds to a high correlation category.

18. The method of claim 11, wherein the adaptively adjusting of the initial bit allocation includes:
predefining a set of checkup tables storing adjustment values for inter frames based on a correlation category and a mini group of pictures (mini GOP) structure;
receiving inter frames of the set of input frames classified into a very low correlation category, a low correlation category, a moderate correlation category, or a high correlation category;
detecting a mini group of pictures in the set of input frames;
calculating a sum of bits allocated to frames in the mini group of pictures and a minimum correlation among frames in the mini group of pictures; and
detecting, for each frame in the mini group of pictures, a corresponding adjustment value in the checkup table and multiplying the adjustment value with the sum of bits allocated to generate an output bit allocation.

19. The method of claim 11, including calculating a target buffer fullness based on the finalized bit allocation.

20. The method of claim 11, including deriving a quantization parameter for the first input frame based on the finalized bit allocation for the first input frame.

21. At least one article of manufacture comprising instructions to cause a computing device to at least:
execute a look ahead analysis and temporal correlation analysis on a set of input frames;
estimate an initial bit allocation for a first input frame of the set of input frames based on multiplication of a bit budget for the set of input frames by a ratio of a first complexity of the first input frame to a sum of complexities of the set of input frames;
adaptively adjust the initial bit allocation based on an estimated temporal correlation level;
determine a finalized bit allocation for the first input frame based on a buffer fullness update; and
encode the first input frame based on the finalized bit allocation.

22. The at least one article of manufacture of claim 21, wherein the instructions are to cause the computing device to generate statistics for a predetermined number of frames.

23. The at least one article of manufacture of claim 21, wherein the instructions are to cause the computing device to estimate a temporal correlation level for each frame in the set of input frames.

24. The at least one article of manufacture of claim 21, wherein the instructions are to cause the computing device to adjust the initial bit allocation for the first input frame based on a correlation category of a subsequent frame with a lowest correlation category among subsequent frames of the first input frame in response to detecting that the first input frame is an intra frame.

25. The at least one article of manufacture of claim 21, wherein the instructions are to cause the computing device to increase the initial bit allocation above a first threshold in response to detecting that the first input frame is an intra frame and that a lowest correlation category among subsequent frames of the first input frame correspond to a moderate correlation category.

* * * * *